United States Patent
Kook et al.

(10) Patent No.: US 10,661,776 B1
(45) Date of Patent: May 26, 2020

(54) APPARATUS AND METHOD FOR CONTROLLING TRANSMISSION OF VEHICLE

(71) Applicants: HYUNDAI MOTOR COMPANY, Seoul (KR); KIA MOTORS CORPORATION, Seoul (KR)

(72) Inventors: Jae Chang Kook, Hwaseong-si (KR); Kwang Hee Park, Suwon-si (KR); Byeong Wook Jeon, Seoul (KR); Sang Jun Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/394,237

(22) Filed: Apr. 25, 2019

(30) Foreign Application Priority Data

Nov. 21, 2018 (KR) .......................... 10-2018-0144639

(51) Int. Cl.
*F16H 61/02* (2006.01)
*B60W 10/11* (2012.01)
B60W 30/19 (2012.01)
B60W 40/076 (2012.01)

(52) U.S. Cl.
CPC ............ *B60W 10/11* (2013.01); *B60W 30/19* (2013.01); *B60W 40/076* (2013.01); *B60W 2420/42* (2013.01); *B60W 2420/52* (2013.01); *B60W 2552/15* (2020.02); *B60W 2552/35* (2020.02)

(58) Field of Classification Search
CPC .......... F16H 59/44; F16H 59/48; F16H 59/66; F16H 2059/666; F16H 2061/0087; F16H 2061/022; F16H 61/0213; F16H 61/04; B60W 10/11; B60W 30/18; B60W 30/19; B60W 40/06; B60W 50/0097; B60W 2552/35; B60W 2554/20; B60W 2554/60; B60W 2554/80
See application file for complete search history.

(56) References Cited

U.S. PATENT DOCUMENTS

| | | | |
|---|---|---|---|
| 9,074,544 B2 | 7/2015 | Noumura et al. | |
| 9,983,589 B2 | 5/2018 | Foster et al. | |
| 2010/0094516 A1* | 4/2010 | Sawada ................. | B60K 28/16 701/55 |

(Continued)

FOREIGN PATENT DOCUMENTS

| JP | 5556523 B2 | 7/2014 |
|---|---|---|
| KR | 10-2018-113749 | 10/2018 |

*Primary Examiner* — Edwin A Young
(74) *Attorney, Agent, or Firm* — Brinks Gilson & Lione

(57) ABSTRACT

An apparatus for controlling a transmission of a vehicle includes: a prediction device that obtains first driving data of the vehicle while driving in a predetermined section of a road ahead of a speed bump and predicts second driving data of the vehicle behind the speed bump, based on the first driving data of the vehicle; a calculation device that calculates a predicted gear ratio of the transmission, based on the predicted second driving data and a grade of the predetermined section of the road ahead of the speed bump; and a controller that determines a target gear ratio into which a current gear ratio of the transmission is to be shifted based on the predicted gear ratio and performs transmission control for the vehicle according to the determined target gear ratio.

22 Claims, 17 Drawing Sheets

(56) References Cited

U.S. PATENT DOCUMENTS

| 2012/0046857 | A1* | 2/2012 | Mori | G06K 9/00805 |
|---|---|---|---|---|
| | | | | 701/301 |
| 2013/0166101 | A1 | 6/2013 | Noumura et al. | |
| 2017/0122430 | A1* | 5/2017 | Jerger | B60R 1/00 |
| 2018/0290643 | A1 | 10/2018 | Jeon et al. | |

* cited by examiner

| GRADE | $\text{SIN}(\tan^{-1}\frac{\text{GRADE}}{100})$ |
|---|---|
| −40 | −0.4 |
| −30 | −0.3 |
| −20 | −0.2 |
| −10 | −0.1 |
| 0 | 0 |
| 10 | 0.1 |
| 20 | 0.2 |
| 30 | 0.3 |
| 40 | 0.4 |

FIG.7

$a_1 > \boxed{a_2} > \text{ⓐ} > a_3 > \cdots > a_7 > a_8$

↑
PREDICTED
ACCELERATION

FIG. 8B

APPARATUS AND METHOD FOR CONTROLLING TRANSMISSION OF VEHICLE

CROSS-REFERENCE TO RELATED APPLICATION

This application claims priority to and the benefit of priority to Korean Patent Application No. 10-2018-0144639, filed on Nov. 21, 2018, the entire contents of which are incorporated herein by reference.

FIELD

The present disclosure relates to an apparatus and method for controlling a transmission of a vehicle.

BACKGROUND

The statements in this section merely provide background information related to the present disclosure and may not constitute prior art.

In general, when a speed bump is ahead of a vehicle, the driver decelerates the vehicle before passing over the speed bump and accelerates the vehicle again while passing over the speed bump.

In this case, transmission control is performed to obtain an efficient acceleration force when the vehicle is accelerated again because gears are changed due to the deceleration before passing the speed bump.

However, the transmission control in the related art is performed in a constant pattern. We have discovered that, in unexpected situations such as traveling on a downhill road or an uphill road, the transmission control may have a limitation in selecting an appropriate gear to accelerate the vehicle again after passing a speed bump or the like.

For example, in a case where a speed bump is on a downhill road or an uphill road is right behind a speed bump, it is not appropriate to accelerate the vehicle again with a gear stage based on the constant pattern control of the transmission. In this case, the vehicle may execute a gear shift again while accelerating again. Therefore, according to the conventional transmission control based on the constant pattern control, gear shift efficiency may be degraded when the vehicle passes over a speed bump on a downhill road or an uphill road.

SUMMARY

The present disclosure has been made to solve the above-mentioned problems occurring in the prior art while advantages achieved by the prior art are maintained intact.

An aspect of the present disclosure provides a vehicle transmission control apparatus and method for determining a gear stage into which the transmission of the vehicle is to be shifted, based on driving data of the vehicle ahead of a speed bump and performing transmission control in advance according to the determined gear stage, thereby improving driver convenience and gear shift performance.

Another aspect of the present disclosure provides a vehicle transmission control apparatus and method for determining a gear stage into which a transmission of the vehicle is to be shifted, in consideration of the grade of a road (e.g., inclination of the road) behind a speed bump, thereby providing efficient acceleration performance when the vehicle accelerates again after passing over the speed bump.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a transmission of a vehicle includes: a prediction device that obtains first driving data of the vehicle while driving in a predetermined section of a road ahead of a speed bump and predicts second driving data of the vehicle behind the speed bump, based on the first driving data of the vehicle; a calculation device that calculates a predicted gear ratio of the transmission, based on the predicted second driving data and a grade of the predetermined section of the road ahead of the speed bump; and a controller that determines a target gear ratio into which a current gear ratio of the transmission is to be shifted, based on the predicted gear ratio and performs transmission control for the vehicle according to the determined target gear ratio.

The first driving data may include deceleration information in a deceleration section corresponding to a period of time from a predetermined first time to a gear shift reference time corresponding to a gear shift reference position of the vehicle. The predetermined first time is set to be before the gear shift reference time.

The second driving data may include a speed, an acceleration, and an accelerator pedal stroke (APS) of the vehicle predicted based on a time when a predetermined second time elapses after the vehicle passes through the gear shift reference position.

The calculation device may calculate an acceleration for each gear stage based on the predicted APS of the second driving data and may compare the calculated acceleration for each gear stage with the predicted acceleration of the second driving data.

The calculation device may calculate the predicted gear ratio using the predicted speed, the predicted acceleration, and the predicted APS of the second driving data.

The grade of the predetermined section of the road ahead of the vehicle may be an average grade of a predetermined section of the road behind the speed bump.

The grade of the predetermined section of the road ahead of the vehicle may be a maximum grade of a predetermined section of the road behind the speed bump.

The controller may perform the transmission control for the vehicle based on the determined target gear ratio when the vehicle reaches a gear shift reference position ahead of the speed bump.

The prediction device may predict the second driving data based on stored variation pattern information of driving data of the vehicle, which is previously stored when the vehicle passed over the speed bump or other speed bump in the past.

The apparatus according to another form of the present disclosure may further include a communication device that receives information of the road ahead of the vehicle from a navigation system.

The apparatus according to other form of the present disclosure may further include a sensor that obtains information of the speed bump on the road ahead of the vehicle.

In still another form of the present disclosure, a method for controlling a transmission of a vehicle includes: obtaining first driving data of the vehicle while driving in a predetermined section of a road ahead of a speed bump; predicting second driving data of the vehicle behind a speed bump, based on the first driving data of the vehicle; calculating a predicted gear ratio of the transmission, based on the predicted second driving data and a grade of the predetermined section of the road ahead of the speed bump; and determining a target gear ratio into which a current gear ratio of the transmission is to be shifted, based on the predicted gear ratio and performing transmission control for the vehicle based on the determined target gear ratio.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 7 illustrates exemplary grades of a predetermined section of a road in one form of the present disclosure;

Figure 8A:
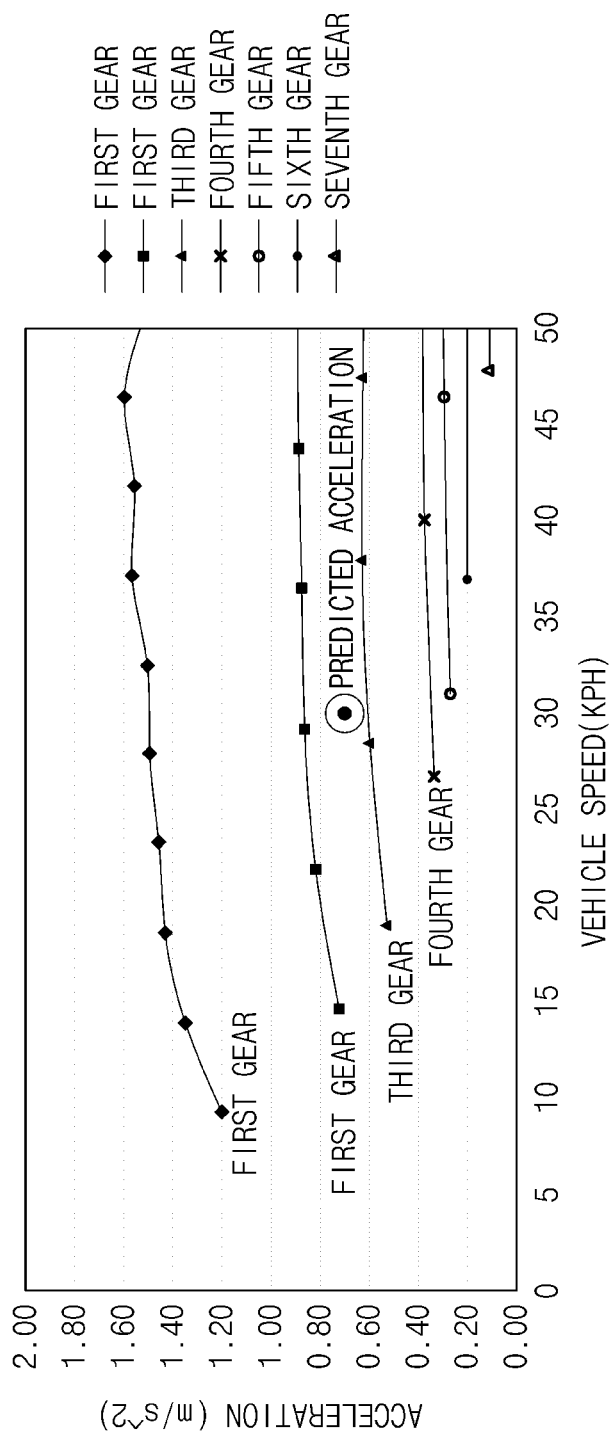
Figure 9:
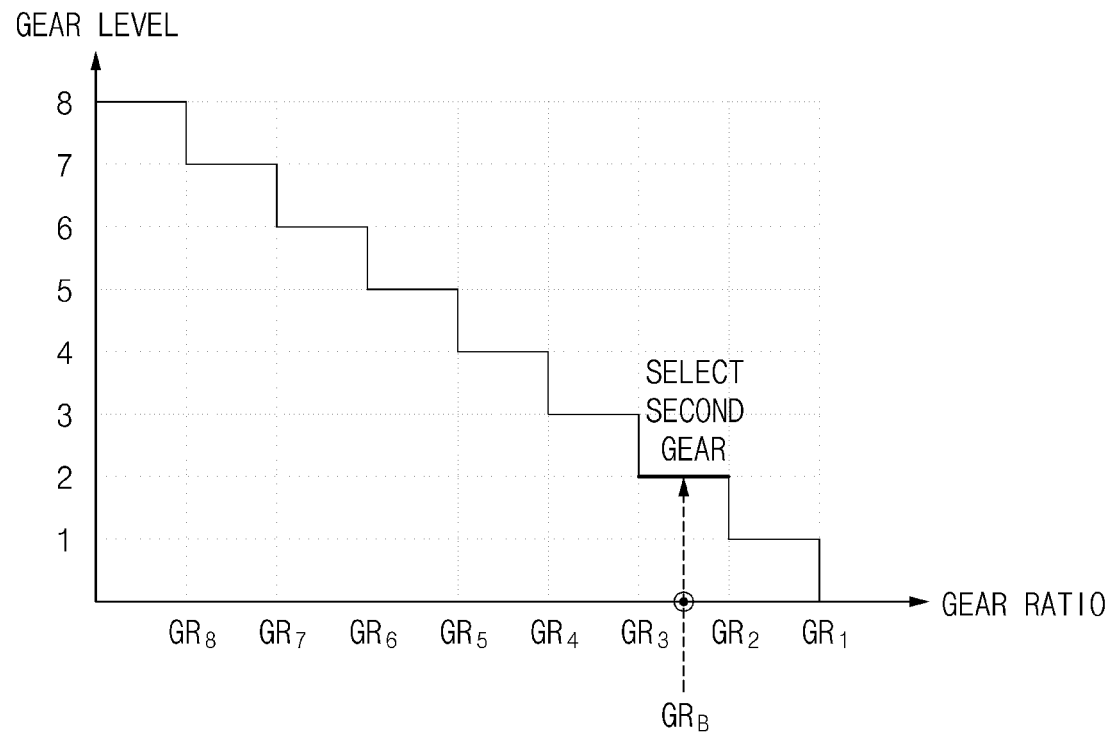
Figure 10:
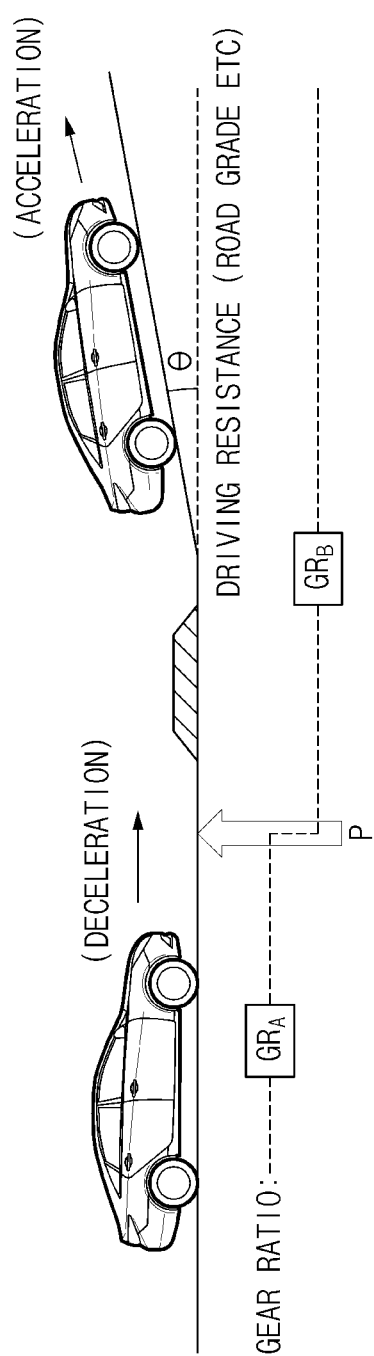
Figure 11:
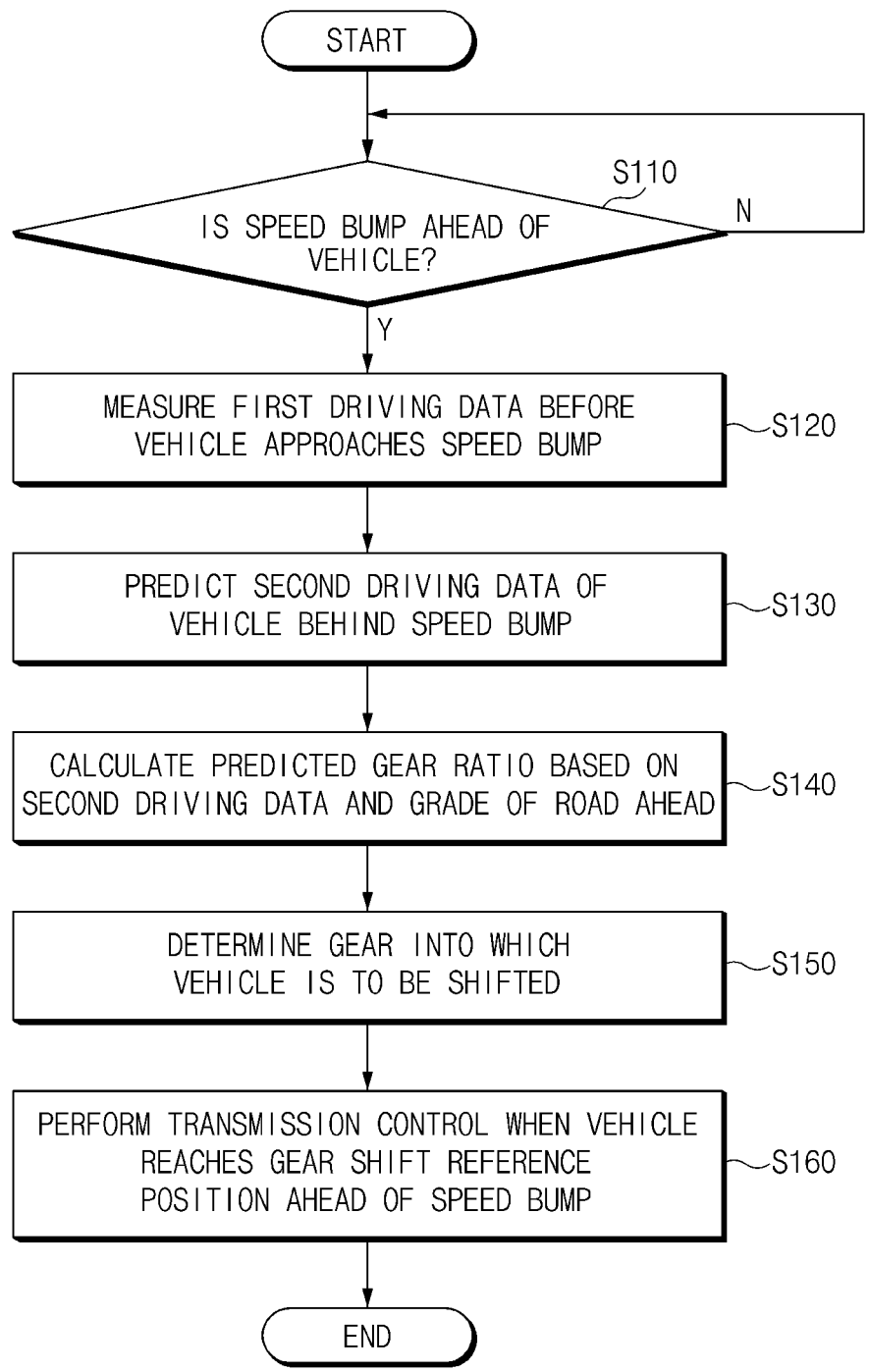
Figure 12:
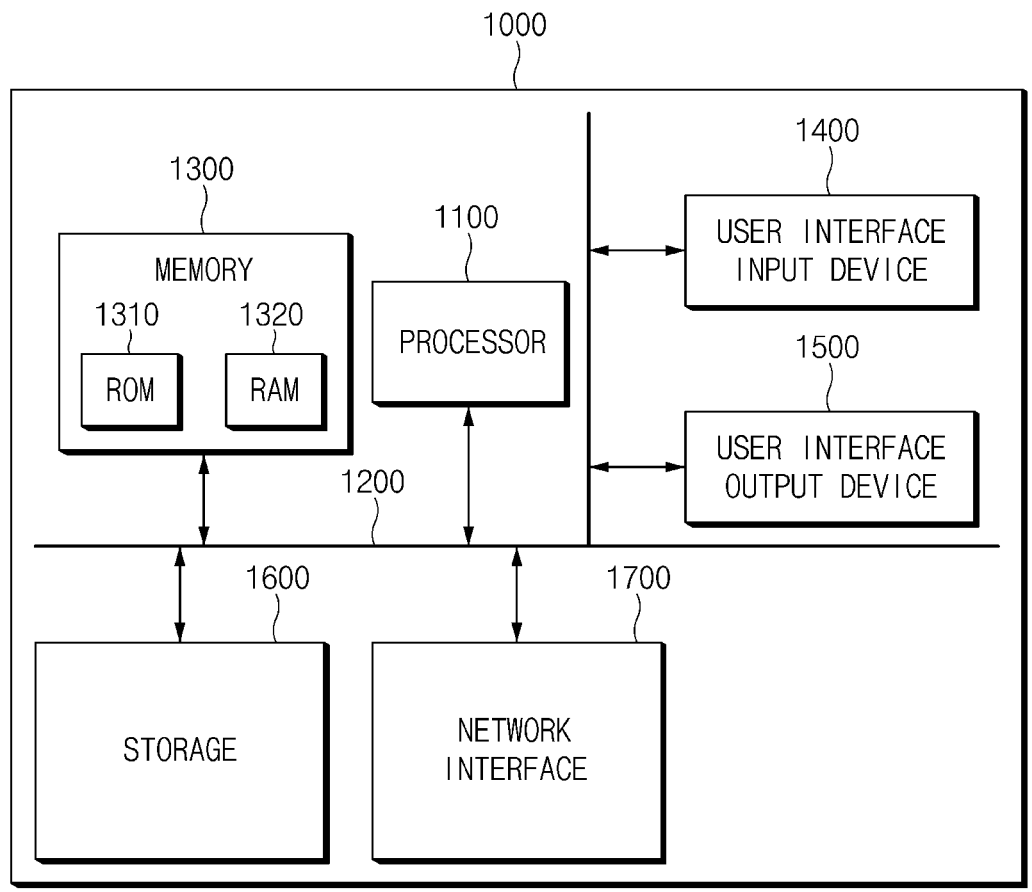

FIGS. 8A to 8B respectively illustrate an calculated acceleration for each gear and an example of comparing a predicted acceleration with a corresponding acceleration for each gear;

FIG. 9 is a graph illustrating a relationship between a gear and a gear ratio in one form of the present disclosure;

FIG. 10 is a view illustrating a gear shift based on a predicted gear ratio when a vehicle reaches a gear shift reference position;

FIG. 11 is a flowchart illustrating a transmission control method according to one form of the present disclosure; and FIG. 12 is a view illustrating a computing system performing a control method according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that even if shown in different drawings, identical components are provided with identical reference numerals in the drawings. Furthermore, in describing the forms of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
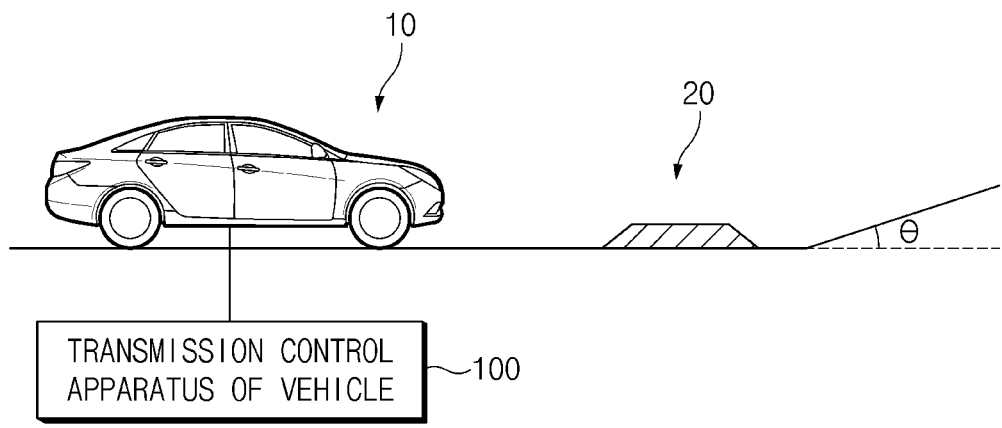
FIG. 1 is a view illustrating a vehicle to which a transmission control apparatus is applied.

FIG. 1 is a view illustrating a vehicle 10 to which a transmission control apparatus 100 according to an form of the present disclosure is applied.

Referring to FIG. 1, the transmission control apparatus 100 of the vehicle 10 may obtain information regarding a road ahead of the vehicle from a navigation system or may obtain information regarding the road ahead through sensors.

Here, in response to a request of the transmission control apparatus 100, the navigation system may extract road information regarding a predetermined section of the road ahead (e.g., the position of a speed bump 20 and/or grade information of the road ahead of the vehicle and the speed bump) from the current position of the vehicle 10 and may provide the extracted information to the transmission control apparatus 100.

Furthermore, the transmission control apparatus 100 may store variation pattern information of driving data of the vehicle 10 at the time that the vehicle 10 passed over the speed bump 20 (or other speed bumps) in the past, and may obtain first driving data of the vehicle while driving in a predetermined section of the road ahead of the speed bump 20 and predict second driving data of the vehicle 10 behind the speed bump 20 based on the stored variation pattern information of the driving data and the first driving data of the vehicle 10.

In this case, the transmission control apparatus 100 may determine a target gear stage (i.e., a target gear ratio) into which a current gear stage of the transmission is to be shifted, by using the predicted second driving data and the grade information of the predetermined section of the road ahead of the speed bump 20 and may perform transmission control based on the determined target gear stage (i.e., target gear ratio) before the vehicle 10 approaches the speed bump 20, thereby improving acceleration performance after the vehicle 10 passes over the speed bump 20.

A detailed configuration of the transmission control apparatus 100 of the vehicle 10 will be described below with reference to FIG. 2.

The transmission control apparatus 100 may be implemented inside the vehicle 10. In this case, the transmission control apparatus 100 may be integrated with internal control units of the vehicle 10. Meanwhile, the transmission control apparatus 100 may be implemented as a separate apparatus and may be connected with the control units of the vehicle 10 by separate connecting means.

Figure 2:
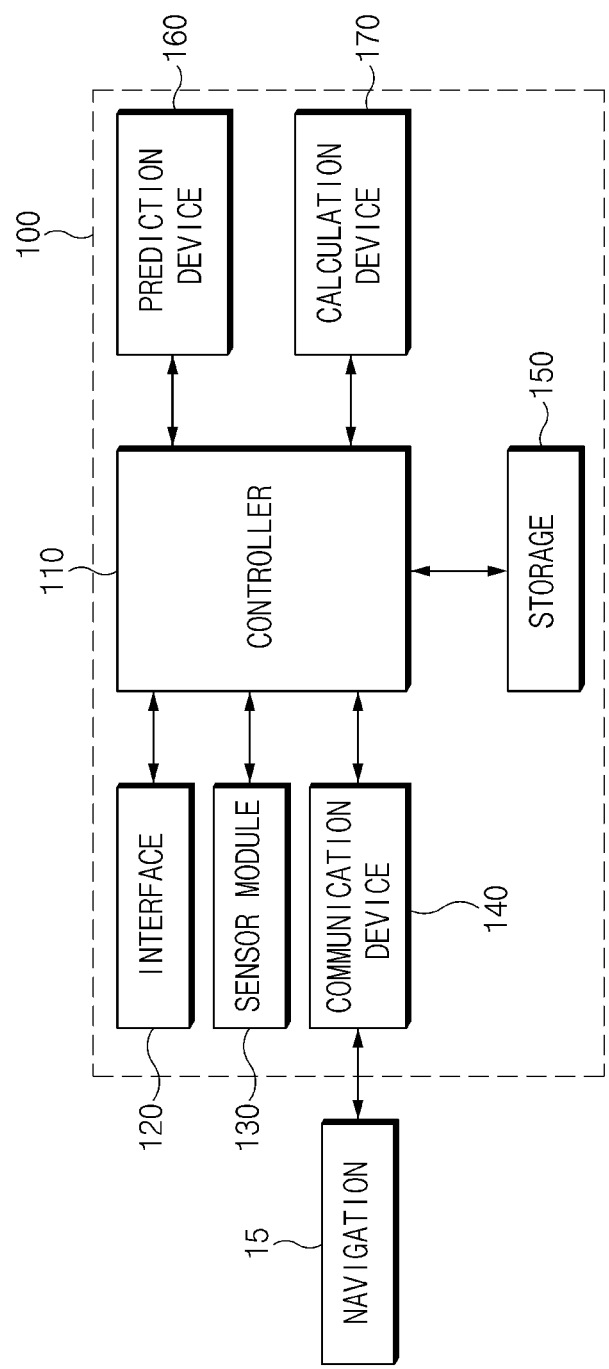
FIG. 2 is a view illustrating a configuration of the transmission control apparatus according to one form of the present disclosure.

FIG. 2 is a view illustrating a configuration of the transmission control apparatus 100 according to one form of the present disclosure.

Referring to FIG. 2, the transmission control apparatus 100 may include a controller 110, an interface 120, a sensor module 130, a communication device 140, storage 150, a prediction device 160, and a calculation device 170. Here, the controller 110, the prediction device 160, and the calculation device 170 of the transmission control apparatus 100 may be implemented as at least one processor.

The interface 120 may include an input means for receiving a control command from a user and an output means for outputting operational states and results of the transmission control apparatus 100.

Here, the input means may include a key button and may also include a mouse, a joystick, a jog shuttle, a stylus pen, or the like. Furthermore, the input means may also include a soft key implemented on a display.

The output means may include a display and may also include a sound output means such as a speaker. In a case where the display is equipped with a touch sensor such as a touch film, a touch sheet, a touch pad, or the like, the display may operate as a touch screen and may be implemented in a form in which an input means and an output means are integrated with each other.

For example, the display may display information regarding the road ahead and may also display transmission control information determined by the transmission control apparatus 100.

The display may include at least one of a liquid crystal display (LCD), a thin film transistor liquid crystal display (TFF LCD), an organic light-emitting diode (OLED) display, a flexible display, a field emission display (FED), and a three-dimensional (3D) display.

The sensor module 130 may include one or more sensors that sense an obstacle around the vehicle 10 and detect information regarding the corresponding obstacle. For example, the sensor module 130 may include LiDAR, a camera, or the like for detecting information regarding the speed bump 20 on the road ahead. In addition, any sensor capable of detecting information regarding an obstacle such as the speed bump 20 is applicable to the sensor module 130.

Meanwhile, the sensor module 130 may further include a sensor that measures the speed, acceleration, and/or APS of the vehicle 10.

The communication device 140 may include a communication module that supports communication interface with electronic units and/or control units included in the vehicle 10. For example, the communication module may be communicatively coupled with the navigation system 15 of the vehicle 10 to receive information regarding the road ahead of the vehicle from the navigation system 15. Furthermore, the communication module may receive driving data (e.g., the speed, acceleration, and/or APS) of the vehicle 10 from the control units included in the vehicle 10. Here, the communication module may include a module that supports vehicle network communication such as controller area network (CAN) communication, local interconnect network (LIN) communication, Flex-Ray communication, or the like.

In addition, the communication device 140 may further include a communication module that supports wireless Internet access and/or a communication module that supports short range communication. Here, a wireless Internet technology may include a wireless LAN (WLAN), wireless broadband (Wibro), Wi-Fi, world interoperability for microwave access (Wimax), or the like, and a short range communication technology may include Bluetooth, ZigBee, ultra wideband (UWB), radio frequency identification (RFID), infrared data association (IrDA), or the like.

The storage 150 may store data and/or algorithms desired for operating the transmission control apparatus 100.

For example, the storage 150 may store variation pattern information of driving data of the vehicle 10 at the time that the vehicle 10 passes over the speed bump 20 or other speed bumps. Furthermore, the storage 150 may store commands and/or algorithms for predicting second driving data of the vehicle 10 behind the speed bump 20, determining a gear ratio into which a current gear ratio of the transmission of the vehicle 10 is to be shifted, and performing transmission control.

In addition, the storage 150 may store information regarding the road ahead of the vehicle that is obtained through the navigation system 15 and/or the sensor module 130, and may store driving data of the vehicle 10 that is obtained during travel of the vehicle 10.

Here, the storage 150 may include a storage medium such as a random access memory (RAM), a static random access memory (SRAM), a read-only memory (ROM), a programmable read-only memory (PROM), or an electrically erasable programmable read-only memory (EEPROM).

The controller 110 may determine whether the speed bump 20 is ahead of the vehicle 10 on the road, based on the information regarding the road on which the vehicle is traveling, which may be obtained by the navigation system 15 and/or the sensor module 130. When it is identified that a speed bump 20 is ahead of the vehicle 10 on the road, the controller 110 may obtain first driving data of the vehicle 10 in a predetermined section of the road ahead of the speed bump 20. Here, the predetermined section may be a deceleration section ahead of the speed bump 20. For example, the predetermined section may be defined by a period of time from a predetermined first time to a gear shift reference time corresponding to a gear shift reference position of the transmission. In particular, the predetermined first time is set to be before the gear shift reference time (e.g., one second before the gear shift reference time).

When the vehicle 10 reaches the predetermined section ahead of the speed bump 20, the controller 110 may obtain the first driving data from the sensor module 130 and/or the control units connected thereto through the communication device 140.

In this case, the first driving data may include deceleration information of the vehicle 10 in the predetermined section ahead of the speed bump 20. In addition, the first driving data may further include speed information at the time that the vehicle 10 reaches the gear shift reference position.

When the first driving data is obtained, the controller 110 may transfer the obtained first driving data to the prediction device 160.

The prediction device 160 may predict second driving data of the vehicle 10 behind the speed bump 20, by using the first driving data transferred from the controller 110. Here, the second driving data may include predicted information regarding the speed, acceleration, and/or accelerator pedal stroke (APS) of the vehicle 10.

The prediction device 160 may predict the second driving data based on the time when a predetermined second time elapses after the vehicle passes through the gear shift reference position. One exemplary form relating to this operation will be described with reference to FIG. 3.

Figure 3:
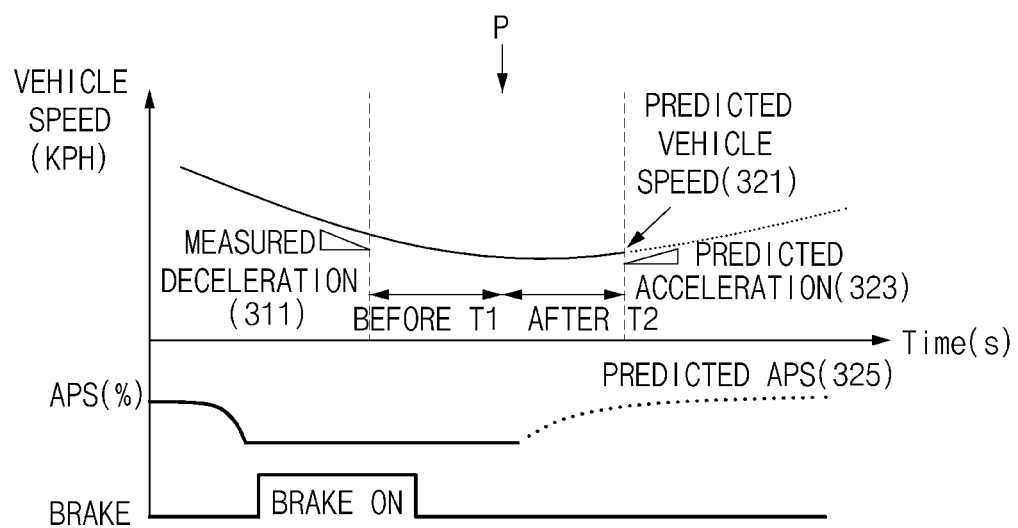
FIG. 3 illustrates a relationship between a speed and an APS of a vehicle, and an operational state of a brake before the vehicle approaches a speed bump in one form of the present disclosure.

FIG. 3 illustrates the speed and APS of the vehicle 10 and an operational state of a brake before the vehicle approaches the speed bump 20. As illustrated in FIG. 3, the vehicle 10 may decelerate before approaching the speed bump 20. First driving data, as represented by reference numeral 311, may include deceleration information measured in a deceleration section corresponding to a period of time from a predetermined first time to a gear shift reference time corresponding to a gear shift reference position P ahead of the speed bump 20. In particular, the predetermined first time may be set to be before the gear shift reference time (e.g., one second before the gear shift reference time). In addition, the first driving data may further include information regarding the approach speed of the vehicle 10 to the gear shift reference position P.

The prediction device 160 may extract the variation pattern information of the driving data stored in the storage 150 and may predict second driving data corresponding to the first driving data, based on the extracted variation pattern information of the driving data. In this case, the prediction device 160, as represented by reference numerals 321, 323, and 325, may predict the speed, acceleration, and APS of the vehicle 10 based on the time when a predetermined second time (e.g., 1 to 2 seconds) elapses after the vehicle 10 passes through the gear shift reference position P. Here, the predetermined first time and the predetermined second time may be set to the same time, or the predetermined second time may be set to be longer than the first time.

Forms of a variation pattern of driving data while the vehicle 10 passes over the speed bump 20, or other speed bumps will be described with reference to FIGS. 4A to 4C.

Figure 4A:
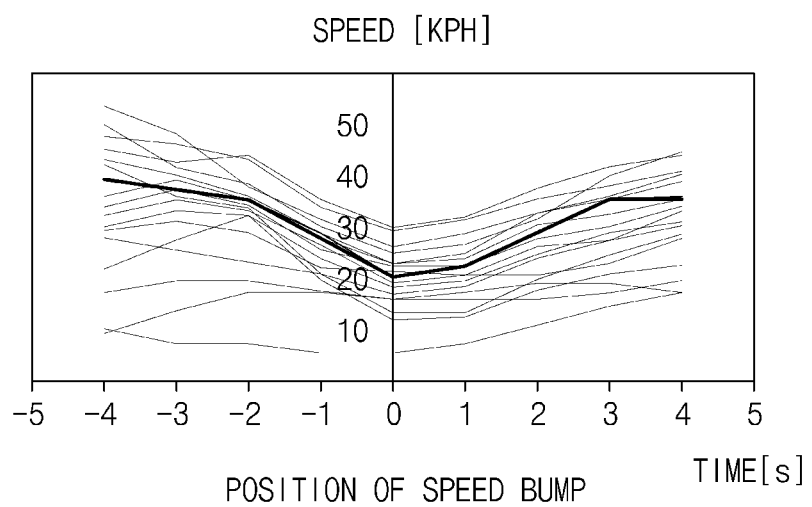
FIGS. 4A to 4C are graphs respectively depicting a speed variation, an acceleration variation, and an APS variation while a vehicle passes over a speed bump in one form of the present disclosure.

FIG. 4A is a graph depicting a speed variation while the vehicle 10 passes over the speed bump 20 or other speed bumps. Referring to FIG. 4A, it can be identified that the speed decreases until the vehicle 10 approaches the speed bump 20 and increases after the vehicle 10 passes over the speed bump 20.

Figure 4B:
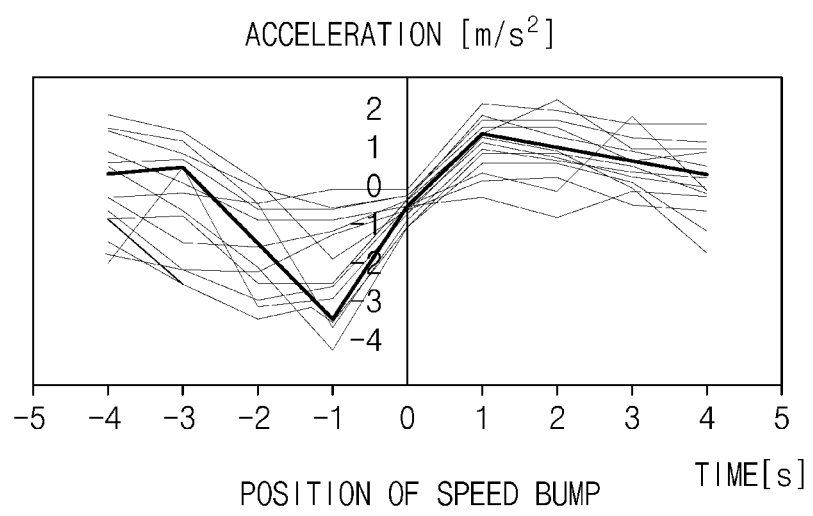

FIG. 4B is a graph depicting an acceleration variation while the vehicle 10 passes over the speed bump 20. Referring to FIG. 4B, it can be identified that the acceleration decreases before the vehicle 10 approaches the speed bump 20 and increases while the vehicle 10 passes over the speed bump 20.

Figure 4C:
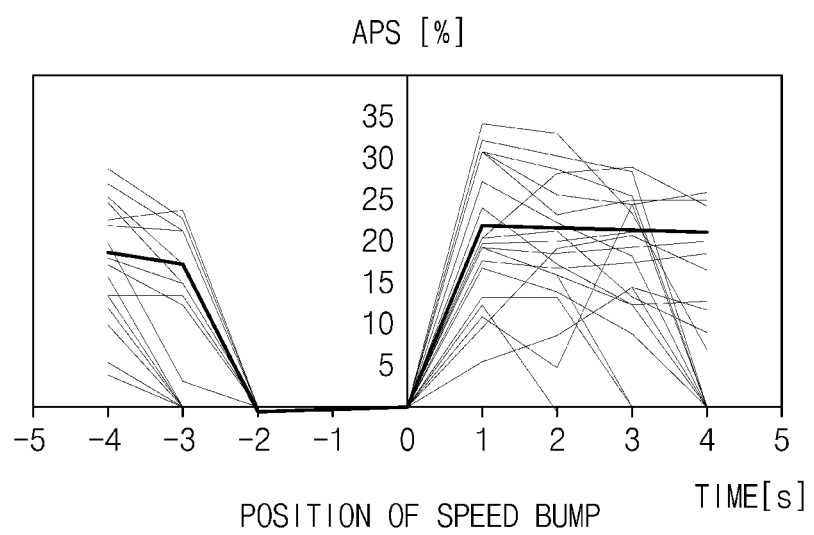

FIG. 4C is a graph depicting an APS variation while the vehicle 10 passes over the speed bump 20. Referring to FIG. 4C, it can be identified that the APS is zero ("0") when the vehicle 10 approaches the speed bump 20 and increases after the vehicle 10 passes over the speed bump 20.

The prediction device 160 may identify the first driving data, for example, the deceleration of the vehicle 10 in the predetermined section ahead of the speed bump 20. The prediction device 160 may extract the variation pattern information of the driving data stored in the storage 150 and may predict second driving data, that is, the speed, acceleration, and APS of the vehicle 10 behind the speed bump 20 (i.e., after passing the speed bump) according to the deceleration of the first driving data, based on the extracted variation pattern information of the driving data.

Forms of a degree of change of driving data of the vehicle 10 ahead of the speed bump 20 and driving data of the vehicle 10 behind the speed bump 20 will be described with reference to FIGS. 5A to 5C.

Figure 5A:
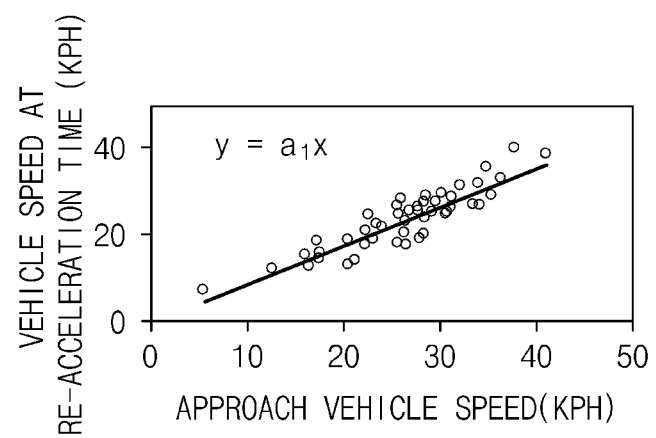
FIGS. 5A to 5C are graphs respectively depicting a speed variation, an acceleration variation, and an APS variation at re-acceleration time after the passage of a vehicle over a speed bump in one form of the present disclosure.

FIG. 5A is a graph depicting a speed variation at re-acceleration time after the passage of the vehicle 10 over the speed bump 20 according to an approach speed variation. Referring to FIG. 5A, a relationship between approach speed and speed at re-acceleration time according to a variation pattern of driving data of the vehicle 10 may be expressed by Equation $y=a_1 x$.

Accordingly, the prediction device 160 may predict a speed "$V_p$" at re-acceleration time after the passage of the vehicle 10 over the speed bump 20 by substituting an approach speed "V" of the first driving data into the graph of FIG. 5A.

For example, the speed predicted by the prediction device 160 may be $V_p = Ka \times v$ [KPH]. Here, "v" denotes the approach speed of the first driving data, "$V_p$" denotes the speed at the re-acceleration time after the passage of the vehicle 10 over the speed bump 20, and "Ka" denotes an arbitrary coefficient.

Figure 5B:
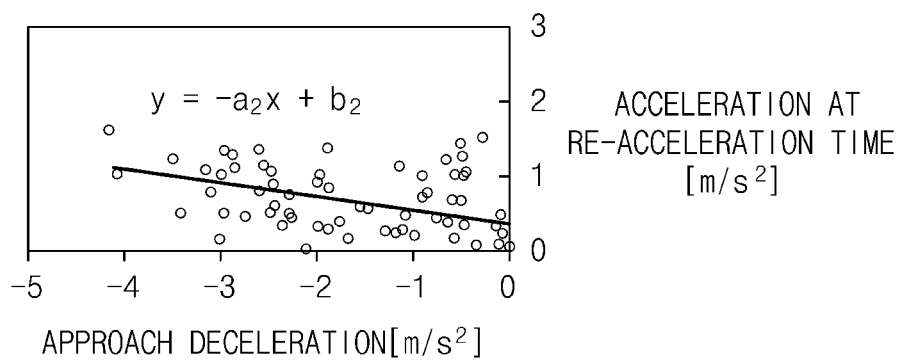

FIG. 5B is a graph depicting an acceleration variation at re-acceleration time after the passage of the vehicle 10 over the speed bump 20 according to a deceleration variation. Referring to FIG. 5B, a relationship between decelerations and accelerations at re-acceleration time according to a variation pattern of driving data of the vehicle 10 may be expressed by Equation $y=-a_2 x+b_2$. Accordingly, the prediction device 160 may predict an acceleration "$A_p$" at re-acceleration time after the passage of the vehicle 10 over the speed bump 20 by substituting a deceleration "$-a$" of the first driving data into the graph of FIG. 5B.

For example, the acceleration predicted by the prediction device 160 may be $A_p = Kb \times a$ [m/s$^2$]. Here, "a" is the absolute value of the deceleration "$-a$" of the vehicle 10 at the time that the vehicle 10 approaches the speed bump 20, "$A_r$" denotes the predicted acceleration at the re-acceleration time after the passage of the vehicle 10 over the speed bump 20, and "Kb" denotes an arbitrary coefficient.

Figure 5C:
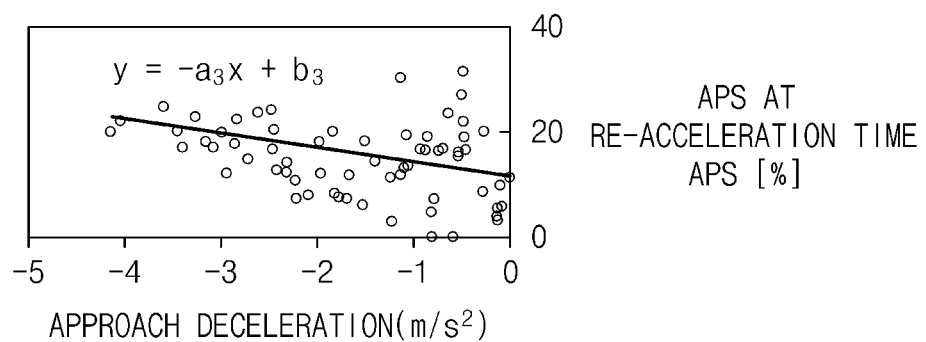

FIG. 5C is a graph depicting an APS variation at re-acceleration time after the passage of the vehicle 10 over the speed bump 20 according to a deceleration variation. Referring to FIG. 5C, a relationship between decelerations and APS at re-acceleration time according to a variation pattern of driving data of the vehicle 10 may be expressed by Equation $y=-a_3 x+b_3$. Accordingly, the prediction device 160 may predict an APS ($T_p$) at re-acceleration time after the passage of the vehicle 10 over the speed bump 20 by substituting a deceleration "$-a$" of the first driving data into the graph of FIG. 5C.

For example, the APS predicted by the prediction device 160 may be $T_p = Kc \times a$ [%]. Here, "a" is the absolute value of the deceleration "$-a$" of the vehicle 10 at the time that the vehicle 10 approaches the speed bump 20, "$T_p$" denotes the predicted APS at the re-acceleration time after the passage of the vehicle 10 over the speed bump 20, and "Kc" denotes an arbitrary coefficient. The coefficients "Ka", "Kb", and "Kc" may vary depending on a road condition.

The prediction device 160 may generate second driving data that includes the predicted speed, the predicted acceleration, and the predicted APS and may transfer the generated second driving data to the controller 110 and/or the calculation device 170.

The calculation device 170 may calculate a predicted gear ratio of the vehicle 10, based on the second driving data generated by the prediction device 160 and the grade of the predetermined section of the road ahead.

Here, the calculation device 170 may calculate an engine torque for each gear, based on the APS of the second driving data and may calculate acceleration for each gear by using the engine torque for each gear.

For example, the calculation device 170 may calculate the engine torque for each gear by using Equation 1 below.

$$Te_j = Te_{max} \times (A_p / A_{max})$$ [Equation 1]

In Equation 1, "$Te_j$" denotes the engine torque with respect to the predicted APS, "$Te_{max}$" denotes the maximum engine torque, "$A_p$" denotes the predicted APS, and "$A_{max}$" denotes the APS at the maximum engine torque.

Figure 6:
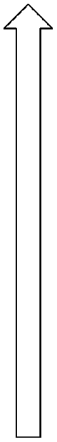
FIG. 6 is a table illustrating engine torque at each gear calculated based on a predicted APS in one form of the present disclosure.

The engine torque for each gear, which is calculated with respect to the predicted APS, will be described with reference to FIG. 6. FIG. 6 illustrates one form in which the APS at the maximum engine torque is 60% and the predicted APS is 20%.

The calculation device 170 may calculate the acceleration for each gear by using the engine torque for each gear, which is calculated by Equation 1 above, the second driving data, and the grade of the predetermined section of the road ahead.

For example, the calculation device 170 may calculate the acceleration for each gear by using Equation 2 below.

$$a_i = \frac{1}{m}\left(\frac{Te_j \times GR_i \times FGR \times \eta}{R} - (f_0 + f_1 v + f_2 V^2) - mg\sin\theta\right) \quad \text{[Equation 2]}$$

In Equation 2, "a" denotes the acceleration of an i-th gear, "$Te_j$" denotes the engine torque in the predicted APS condition, "$GR_i$" denotes the gear ratio of the i-th gear, "FGR" denotes the final reduction gear ratio, "$\eta$" denotes an efficiency constant, 'V' denotes the predicted vehicle speed, "m" denotes the weight of the vehicle 10, "g" denotes the acceleration of gravity, "$\theta$" denotes the grade (road slope) of the predetermined section of the road ahead, and "f0 to f2" denote arbitrary coefficients.

Here, the grade of the predetermined section of the road ahead may be determined to be an average grade or a maximum grade of a predetermined section, for example, a section of 10$m$ behind the speed bump 20. Sine for each grade may be defined as illustrated in FIG. 7.

The acceleration for each gear, which is calculated by the calculation device 170, may be represented as in FIG. 8A. In this case, as illustrated in FIG. 8B, the calculation device 170 may compare the predicted acceleration and the acceleration for each gear. The calculation device 170 may select acceleration greater than the predicted acceleration and may determine a gear ratio that satisfies the selected acceleration.

For example, the calculation device 170 may calculate a predicted gear ratio by applying the speed, acceleration, and APS predicted by the prediction device 160 to Equation 3 below.

$$GR_B = \frac{R}{Te_j \times FGR \times \eta}\left(ma_B + \frac{1}{2}C_d\rho A V^2 + \mu mg\cos\theta + mg\sin\theta\right) \quad \text{[Equation 3]}$$

In Equation 3, "$GR_B$" denotes the predicted gear ratio, "j" denotes the predicted APS, "$Te_j$" denotes the engine torque in the predicted APS condition, "FGR" denotes the final reduction gear ratio, "$\eta$" denotes an efficiency constant, "R" denotes the dynamic tire radius, "m" denotes the weight of the vehicle 10, "as" denotes the predicted acceleration, "$C_d$" denotes the air resistance coefficient, "$\rho$" denotes the density of air, "A" denotes the front projection area, 'V' denotes the predicted vehicle speed, "$\mu$" denotes the coefficient of rolling friction, "g" denotes the acceleration of gravity, and "$\theta$" denotes the grade (road slope).

The controller 110 may determine a gear into which the vehicle 10 is to be shifted, based on the predicted gear ratio calculated by the calculation device 170 and may perform transmission control according to the determined gear.

One form for determining a gear into which the vehicle 10 is to be shifted, based on the predicted gear ratio, will be described with reference to FIG. 9. Referring to FIG. 9, in the graph of gear versus gear ratio illustrated in FIG. 9, the controller 110 may determine second gear corresponding to the predicted gear ratio $GR_B$ to be a gear into which the vehicle 10 is to be shifted.

Accordingly, as illustrated in FIG. 10, the controller 110 may cause the vehicle 10 to be shifted into the gear determined according to the predicted gear ratio $GR_B$ when the vehicle 10 reaches the gear shift reference position P ahead of the speed bump 20.

In this case, the gear is determined in consideration of the grade of the road behind the speed bump 20. Accordingly, the transmission control apparatus 100 according to the present disclosure may maintain acceleration performance even though the vehicle 10 travels on an uphill or downhill road after passing over the speed bump 20.

The transmission control apparatus 100 according to this form, which operates as described above, may be implemented in the form of an independent hardware apparatus that includes a memory and a processor that processes each operation, and may be operated in the form included in another hardware apparatus such as a microprocessor or a generic-purpose computer system.

Operations of the above-configured transmission control apparatus 100 according to the present disclosure will be described below in more detail.

FIG. 11 is a flowchart illustrating a transmission control method according to one form of the present disclosure.

Referring to FIG. 11, when it is identified that the speed bump 20 is ahead of the vehicle 10 on the road (Step S110), the transmission control apparatus 100 may measure first driving data in a predetermined section ahead of the speed bump 20 (Step S120). Here, the first driving data may include information regarding deceleration and approach speed in the predetermined section.

Specifically, the transmission control apparatus 100 may measure deceleration in a predetermined section from a gear shift reference position ahead of the speed bump 20. Furthermore, the transmission control apparatus 100 may measure the approach speed of the vehicle 10 to the gear shift reference position. The approach speed may be estimated based on the deceleration measured before the vehicle 10 reaches the gear shift reference position and the current speed of the vehicle 10.

The transmission control apparatus 100 may predict second driving data of the vehicle 10 behind the speed bump 20, based on the first driving data measured in Step S120 (Step S130). In Step S130, the transmission control apparatus 100 may predict the second driving data corresponding to the first driving data, by using variation pattern information of driving data stored in advance.

Thereafter, the transmission control apparatus 100 may calculate a predicted gear ratio, based on the second driving data predicted in Step S130 and the grade of the road ahead (Step S140) and may determine a gear into which the vehicle 10 is to be shifted, by using the predicted gear ratio calculated in Step S140 (Step S150).

After the gear is determined in Step S150, the transmission control apparatus 100 may perform transmission control for the vehicle 10 according to the gear determined in Step S150 when the vehicle 10 reaches the gear shift reference position ahead of the speed bump 200 (Step S160).

FIG. 12 is a view illustrating a computing system in which the method according to the form of the present disclosure is executed.

Referring to FIG. 11, the computing system 1000 may include at least one processor 1100, a memory 1300, a user interface input device 1400, a user interface output device 1500, storage 1600, and a network interface 1700 that are coupled together through a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage mediums. For example, the memory 1300 may include a read only memory (ROM) 1310 and a random access memory (RAM) 1320.

Accordingly, the steps of the method or algorithm described in relation to the forms disclosed herein may be directly implemented with a hardware module or a software module executed by the processor 1100, or a combination thereof. The software module may reside in a storage medium (that is, the memory 1300 and/or the storage 1600) such as a RAM memory, a flash memory, a ROM memory, an EPROM memory, an EEPROM memory, a register, a hard disk, a detachable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside in a user terminal. In another case, the processor 1100 and the storage medium may reside in the user terminal as separate components.

The apparatus and method according to the present disclosure determine the gear into which the vehicle is to be shifted, based on the driving data of the vehicle ahead of the speed bump and perform the transmission control in advance according to the determined gear, thereby improving gear shift performance.

In addition, the apparatus and method according to the present disclosure determine the gear into which the vehicle is to be shifted, in consideration of the grade of the road behind the speed bump, thereby providing efficient acceleration performance when the vehicle accelerates again after passing over the speed bump.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. An apparatus for controlling a transmission of a vehicle, the apparatus comprising:
a prediction device configured to obtain first driving data of the vehicle while driving in a predetermined section of a road ahead of a speed bump and configured to predict second driving data of the vehicle behind the speed bump, based on the first driving data of the vehicle;
a calculation device configured to calculate a predicted gear ratio of the transmission, based on the predicted second driving data and a grade of the predetermined section of the road ahead of the speed bump; and
a controller configured to determine a target gear ratio into which a current gear ratio of the transmission is to be shifted, based on the predicted gear ratio and to perform transmission control for the vehicle based on the determined target gear ratio.

2. The apparatus of claim 1, wherein the first driving data includes deceleration information in a deceleration section corresponding to a period of time from a predetermined first time to a gear shift reference time corresponding to a gear shift reference position of the vehicle, and the predetermined first time is set to be before the gear shift reference time.

3. The apparatus of claim 2, wherein the second driving data includes a speed, an acceleration, and an acceleration pedal stroke (APS) of the vehicle predicted based on a time when a predetermined second time elapses after the vehicle passes through the gear shift reference position.

4. The apparatus of claim 3, wherein the calculation device is configured to calculate an acceleration for each gear stage based on the predicted APS of the second driving data and to compare the calculated acceleration for each gear stage with the predicted acceleration of the second driving data.

5. The apparatus of claim 3, wherein the calculation device is configured to calculate the predicted gear ratio using the predicted speed, the predicted acceleration, and the predicted APS of the second driving data.

6. The apparatus of claim 1, wherein the grade of the predetermined section of the road ahead of the vehicle is an average grade of a predetermined section of the road behind the speed bump.

7. The apparatus of claim 1, wherein the grade of the predetermined section of the road ahead of the vehicle is a maximum grade of a predetermined section of the road behind the speed bump.

8. The apparatus of claim 1, wherein the controller is configured to perform the transmission control for the vehicle based on the determined target gear ratio when the vehicle reaches a gear shift reference position ahead of the speed bump.

9. The apparatus of claim 1, wherein the prediction device is configured to predict the second driving data based on stored variation pattern information of driving data of the vehicle, which is previously stored when the vehicle passed over the speed bump or other speed bump in the past.

10. The apparatus of claim 1, further comprising:
a communication device configured to receive information of the road ahead of the vehicle from a navigation system.

11. The apparatus of claim 1, further comprising:
a sensor configured to obtain information of the speed bump on the road ahead of the vehicle.

12. A method for controlling a transmission of a vehicle, the method comprising:
obtaining first driving data of the vehicle while driving in a predetermined section of a road ahead of a speed bump;
predicting second driving data of the vehicle behind the speed bump, based on the first driving data of the vehicle;
calculating a predicted gear ratio of the transmission, based on the predicted second driving data and a grade of the predetermined section of the road ahead of the speed bump; and determining a target gear ratio into which a current gear ratio of the transmission is to be shifted, based on the predicted gear ratio and performing transmission control for the vehicle based on the determined target gear ratio.

13. The method of claim 12, wherein the first driving data includes deceleration information in a deceleration section corresponding to a period of time from a predetermined first time to a gear shift reference time corresponding to a gear shift reference position of the vehicle, and the predetermined first time is set to be before the gear shift reference time.

14. The method of claim 13, wherein the second driving data includes a speed, an acceleration, and an acceleration pedal stroke (APS) of the vehicle predicted based on a time when a predetermined second time elapses after the vehicle passes through the gear shift reference position.

15. The method of claim 14, wherein calculating the predicted gear ratio includes:
  calculating an acceleration for each gear stage based on the predicted APS of the second driving data and comparing the calculated acceleration for each gear stage with the predicted acceleration of the second driving data.

16. The method of claim 14, wherein calculating the predicted gear ratio includes:
  calculating the predicted gear ratio using the predicted speed, the predicted acceleration, and the predicted APS of the second driving data.

17. The method of claim 12, wherein the grade of the predetermined section of the road ahead of the vehicle is an average grade of a predetermined section of the road behind the speed bump.

18. The method of claim 12, wherein the grade of the predetermined section of the road ahead of the vehicle is a maximum grade of a predetermined section of the road behind the speed bump.

19. The method of claim 12, wherein performing the transmission control includes:
  performing the transmission control for the vehicle based on the determined target gear ratio when the vehicle reaches a gear shift reference position ahead of the speed bump.

20. The method of claim 12, wherein predicting the second driving data includes:
  predicting the second driving data based on stored variation pattern information of driving data of the vehicle, which is previously stored when the vehicle passed over the speed bump or other bump in the past.

21. The method of claim 12, further comprising:
  receiving information regarding the road ahead of the vehicle from a navigation system before predicting the second driving data.

22. The method of claim 12, further comprising:
  obtaining information regarding the speed bump ahead of the vehicle on the road by using a sensor before predicting the second driving data.

* * * * *